(12) United States Patent
Fandrich et al.

(10) Patent No.: US 6,520,528 B2
(45) Date of Patent: Feb. 18, 2003

(54) UNDERBED GOOSENECK HITCH ASSEMBLY

(75) Inventors: Bernard G. Fandrich, Lodi, CA (US); Don F. Linger, Stockton, CA (US)

(73) Assignee: Valley Industries LLC, Lodi, CA (US)

( * ) Notice: Subject to any disclaimer, the term of this patent is extended or adjusted under 35 U.S.C. 154(b) by 0 days.

(21) Appl. No.: 09/769,668

(22) Filed: Jan. 25, 2001

(65) Prior Publication Data

US 2002/0060443 A1 May 23, 2002

Related U.S. Application Data

(60) Provisional application No. 60/177,962, filed on Jan. 25, 2000.

(51) Int. Cl.[7] ................................................. B60D 1/48
(52) U.S. Cl. ..................................... 280/496; 280/491.5
(58) Field of Search ................................ 280/495, 496, 280/491.1, 491.5, 491.3, 457, 441.2

(56) References Cited

U.S. PATENT DOCUMENTS

| | | | |
|---|---|---|---|
| 4,657,274 A | | 4/1987 | Mann et al. ................. 280/433 |
| 5,016,898 A | | 5/1991 | Works et al. ................ 280/433 |
| 5,104,138 A | | 4/1992 | Allen ......................... 280/433 |
| 5,240,270 A | * | 8/1993 | Colibert .................... 280/417.1 |
| 5,246,244 A | | 9/1993 | Colibert ...................... 280/495 |
| 5,385,363 A | * | 1/1995 | Morey ........................ 280/511 |
| 5,419,576 A | * | 5/1995 | Van Vleet .................... 280/507 |
| 5,472,222 A | | 12/1995 | Marcy ........................ 280/433 |
| 5,788,258 A | * | 8/1998 | Gill et al. ................. 280/491.1 |
| 5,860,671 A | * | 1/1999 | Mackeown .................... 280/511 |
| 6,095,545 A | * | 8/2000 | Bol, II et al. ............. 280/491.1 |
| 6,158,761 A | * | 12/2000 | King ........................... 280/495 |
| 6,199,890 B1 | * | 3/2001 | Lindenman et al. ..... 280/491.1 |

* cited by examiner

*Primary Examiner*—Avraham Lerner
(74) *Attorney, Agent, or Firm*—Rader, Fishman & Grauer PLLC

(57) ABSTRACT

An underbed gooseneck hitch assembly includes a channel housing that is secured to a pair of angle brackets. The angle brackets are secured to a pair of frame mounting brackets, which are in turn mounted to the frame rails of the vehicle. The hitch assembly also includes a ball socket for receiving a ball hitch. A pull cable handle assembly includes a spring biased retaining pin that can be retracted from and inserted into the ball hitch to secure the ball hitch for use. The ball hitch protrudes above the cargo bed and is attachable to a gooseneck trailer. Insertion of the ball hitch is accomplished by turning the handle of the pull cable handle assembly to an unlocked position, rotating the handle to a locked position, and inserting the ball hitch into the ball socket. The ball hitch is properly aligned with the retaining pin by inserting the ball hitch completely into the ball socket and aligning indicia on the ball hitch with a notch on the ball socket. Removal of the ball hitch is accomplished by turning the handle of the pull cable handle assembly to the unlocked position, pulling the handle outwardly until the retaining pin is no longer received in the ball hitch, rotating the handle to the locked position, and removing the ball hitch from the ball socket.

24 Claims, 3 Drawing Sheets

UNDERBED GOOSENECK HITCH ASSEMBLY

CLAIM OF PRIORITY

This application claims the benefit of U.S. provisional patent application Ser. No. 60/177,962, filed Jan. 25, 2000.

BACKGROUND OF THE INVENTION

1. Field of the Invention

The invention relates to a trailer hitch assembly, and in particular to a trailer hitch assembly for use with a towing vehicle.

2. Description of the Related Art

The design and construction of a trailer hitch assembly for use with the cargo bed of a vehicle presents inherent problems such as installation of the hitch assembly and manipulation of the ball hitch for use and storage. Typically, a trailer hitch assembly mounted on the cargo bed of a vehicle is used to secure a large trailer. The weight of the trailer requires the hitch assembly to be of substantial construction to adequately distribute and carry the load. The prior art primarily discloses trailer hitches that are structurally complex and that require installation by a blacksmith or other skilled artisan. Also typical of the prior art is that the ball hitch requires the use of some tool or mechanical device for manipulating the ball hitch to a position for use or storage.

A conventional trailer hitch for use on the cargo bed of a vehicle includes a ball hitch selectively positioned within a retention sleeve mounted below and through the cargo bed of a vehicle. A locking pin secures the ball hitch in either an upright position wherein the ball hitch is ready for use, or in an inverted position for storing the ball hitch while not in use. This device is satisfactory for its intended purpose. However, the ball hitch is not easily installed or removed because the use of a locking handle located outside the cargo bed of the vehicle is required. Thus, the locking handle must first be operated prior to manipulating the ball hitch to a position for use or storage.

Additional prior art disclosing trailer hitches having a locking handle connected to a locking pin also require an operator to first release the locking pin by engaging an external locking handle and then reaching into the cargo bed to manipulate positioning of the ball hitch.

Yet another hitch assembly requires the use of a lever inserted through an aperture in the ball hitch in order to position it for use or storage.

One final hitch assembly for a goose neck trailer that includes a cross member positioned beneath the cargo bed and between the frame members of the truck. The hitch assembly requires a spring-biased retaining pin attached to a sleeve to engage a vertical groove formed on the exterior of the socket to secure the ball socket for use.

Although each of these trailer hitches are satisfactory for their intended purpose, none of them are as simple in construction nor do they provide the degree of ease in manipulation of the ball hitch as the invention set forth herein.

SUMMARY OF THE INVENTION

One aspect of the invention is to provide an underbed gooseneck hitch assembly that is securable to a vehicle having a pair of substantially parallel spaced frame rails. A housing includes an opening. A ball socket has outer walls, at least one of the outer walls including a socket hole alignable with the opening in the housing. A ball hitch includes a hitch hole alignable with the socket hole in the ball socket. A pull cable assembly includes a retaining pin capable of being inserted into the socket hole and the hitch hole. The retaining pin of the pull cable assembly positively secures the ball hitch in the ball socket when a portion of the retaining pin is inserted through the aligned socket hole and hitch hole. The housing may be mounted to a pair of angle brackets, which are in turn mounted to a pair of frame mounting brackets, which are in turn mounted to the frame rails of the vehicle.

In another aspect of the invention, the hitch comprises a housing that includes an opening. A ball socket has outer walls, at least one of the outer walls including a socket hole alignable with the opening in the housing. A ball hitch includes a neck portion, a central portion and a shank portion including a hitch hole alignable with the socket hole in the ball socket. A retaining pin positively secures the ball hitch in the ball socket when a portion of the retaining pin is inserted through the aligned socket hole and hitch hole. The housing may be mounted to a pair of angle brackets, which are in turn mounted to a pair of frame mounting brackets, which are in turn mounted to the frame rails of the vehicle.

One approach for installing the underbed gooseneck hitch assembly of the invention is to provide a housing having an opening. A ball socket is positioned within the opening in the channel housing. A ball hitch is inserted into the ball socket. Then, the ball hitch is aligned with the ball socket such that a socket hole in the ball socket aligns with a hitch hole in the ball hitch. Finally, a portion of a retaining pin is inserted through the aligned socket hole and hitch hole to positively secure the ball hitch in the ball socket.

Various additional aspects and advantages of this invention will become apparent to those skilled in the art from the following detailed description of the preferred embodiment, when read in light of the accompanying drawings.

DESCRIPTION OF THE PREFERRED EMBODIMENT

Figure 1:
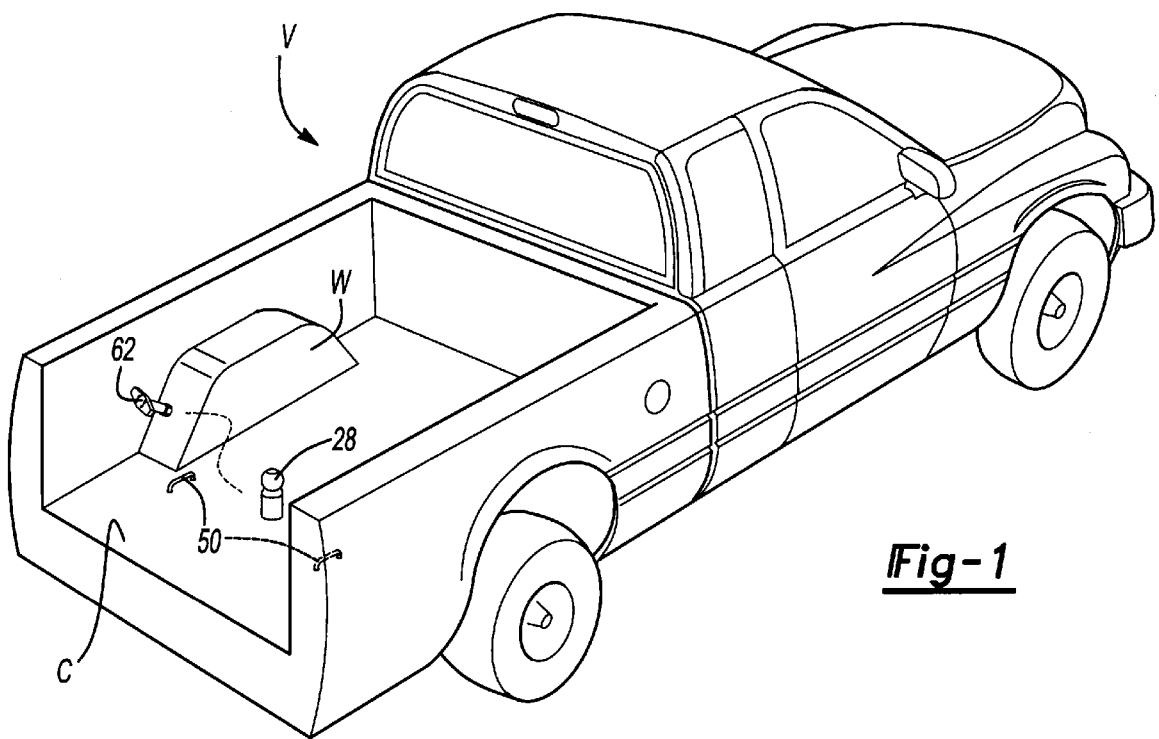
FIG. 1 is a perspective view of a vehicle showing the underbed gooseneck hitch assembly of the invention extending upward through the cargo bed of the vehicle.

As seen in FIG. 1, a utility vehicle V, such as a pickup truck, includes a cargo bed C in which a portion of an underbed gooseneck hitch assembly 10 of the invention protrudes upwardly through the cargo bed C.

Figure 2:
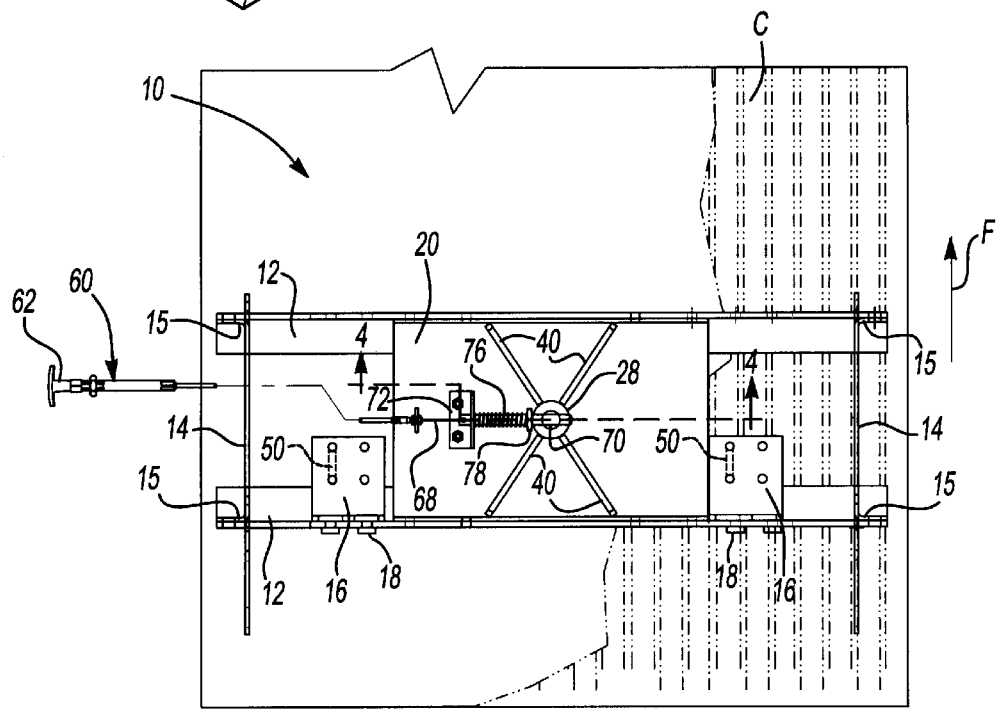
FIG. 2 is a fragmentary bottom view of the invention showing the underbed gooseneck hitch assembly of the invention installed in the vehicle.

Referring now to FIG. 2, the underbed gooseneck hitch assembly 10 includes a channel housing 20 and a pair of angle brackets 12. A pair of substantially parallel frame mounting brackets 14 each include a pair of mounting tabs 15 for mounting the angle brackets 12 to the frame mounting brackets 14 using conventional fasteners (not shown), such as bolts, welded joints, or the like. The angle brackets 12 are mounted to the frame mounting brackets 14 such that one angle bracket 12 is positioned closer to the front F of the vehicle V. The frame mounting brackets 14 are in turn mounted to the frame rails (not shown) of the vehicle V. A pair of support brackets 16 secures to one of the angle brackets 12 by fasteners 18, such as bolts and nuts, and the like.

Figure 3:
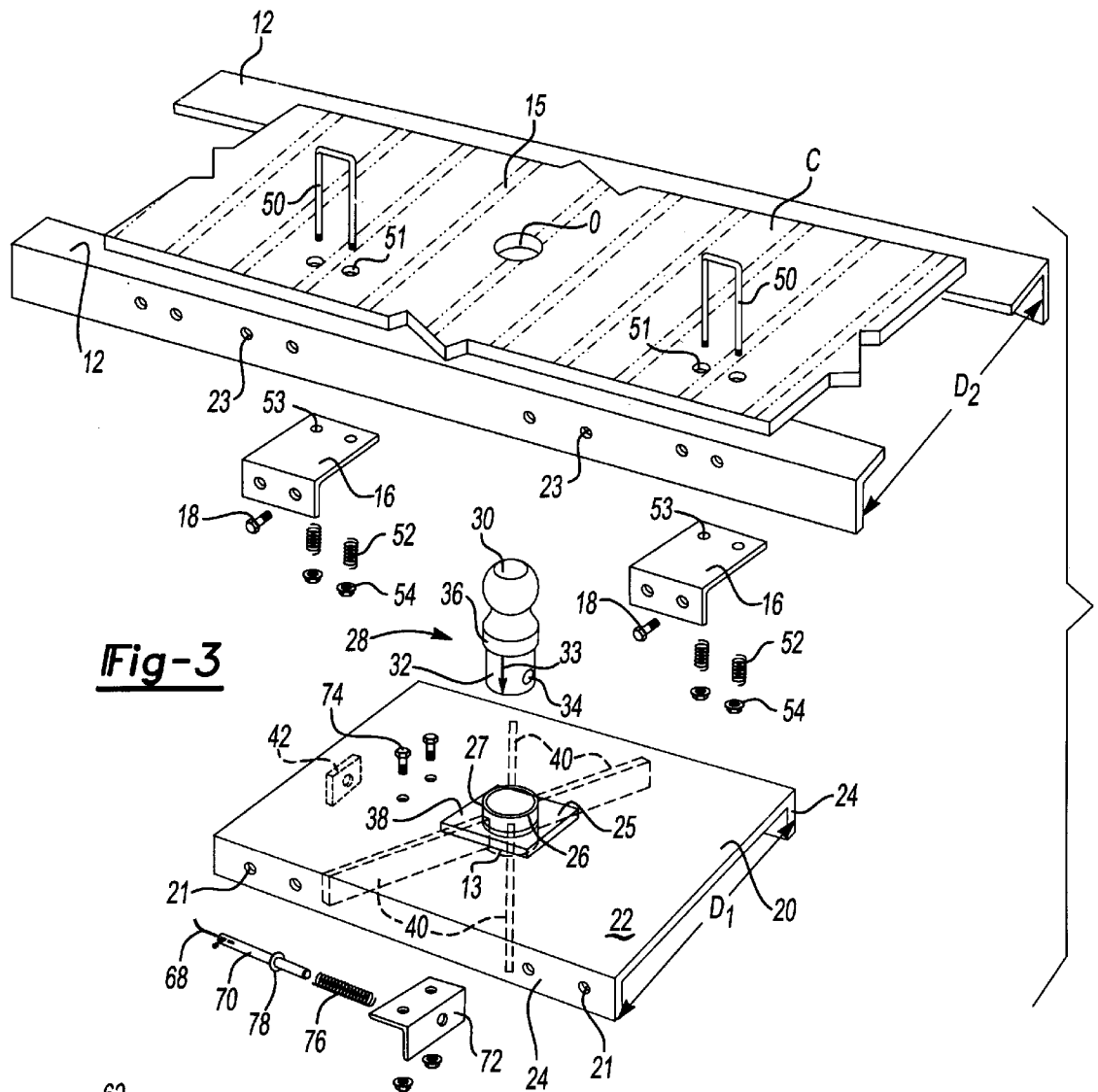
FIG. 3 is an exploded perspective view of the underbed gooseneck hitch assembly of the invention.

Referring now to FIGS. 2 and 3, a channel housing 20 is formed by a load bearing top wall 22 and two vertical depending side walls 24 resulting in a channel-shaped structure. Preferably, the side walls 24 are integrally formed with the top wall 22 to provide structural integrity for the channel housing 20. The channel housing 20 includes an opening 13 formed in the top wall 22 thereof. Although the opening 13 can be formed at any location in the top wall 22, the opening 13 is preferably formed at a central location in the top wall 22. The distance D1 between the outer surface of side plates 24 is slightly smaller than the distance D2 between the angle brackets 12. In this manner, the channel housing 20 can be attached to angle brackets 12 by inserting fasteners 18 through apertures 21 in each side wall 24 of the channel housing 20 and through apertures 23 in each of the angle brackets 12. For illustrative purposes only, only one angle bracket 12 and side plate 24 is shown with apertures 21 and 23, respectively. When attached to the angle brackets 21, the centrally located opening 13 of the channel housing 20 aligns with a centrally located opening O of the cargo bed C.

A ball socket 26 can be received in the centrally located opening 13 of the channel housing 20. The outer walls of the hollow, cylindrical ball socket 26 include a socket hole 25 through at least one outer wall, and preferably through both outer walls of the ball socket 26, the purpose of which will be described below. The outer surface of the ball socket 26 may include indicia 27, such as a notch for aligning the ball socket 26 with the ball hitch 28.

A ball hitch 28 can be received within the ball socket 26. The ball hitch 28 includes a protruding neck portion 30 and a shank portion 32 having a slightly smaller outer diameter than the inner diameter of the ball socket 26. A hitch hole 34 is formed in the shank portion 32 of the ball hitch 28 alignable with the socket hole 25 of the ball socket 26, the purposes of which will be described below. The ball hitch 28 also includes a central portion 36 having a slightly larger outer diameter than the outer diameter of the shank portion 32 and the inner diameter ball socket 26. The outer surface of the ball socket 26 may include a small notch 27 and the ball hitch 28 may include indicia 33, for example, an arrow or other similar indicia, for properly aligning the ball hitch 28 with the ball socket 26.

A reinforcement plate 38 may be secured to the top wall 22 of the channel housing 20 for reinforcing ball socket 26. In addition, one or more braces 40 may be secured to the underside of the channel housing for providing additional structural support for the channel housing 20 and the ball socket 26. To provide optimum support for the channel housing 20, the braces 40 are positioned so as to extend radially outward from the ball socket 26 toward the side walls 24 of the channel housing 20. In addition, a cable brace 42 may be secured to the underside of the top wall 22 of the channel housing, the purpose of which will be described below. The reinforcement plate 38, braces 40 and cable brace 42 may be secured using any well-known means in the art, such as welding, and the like.

Figures 5, 6:
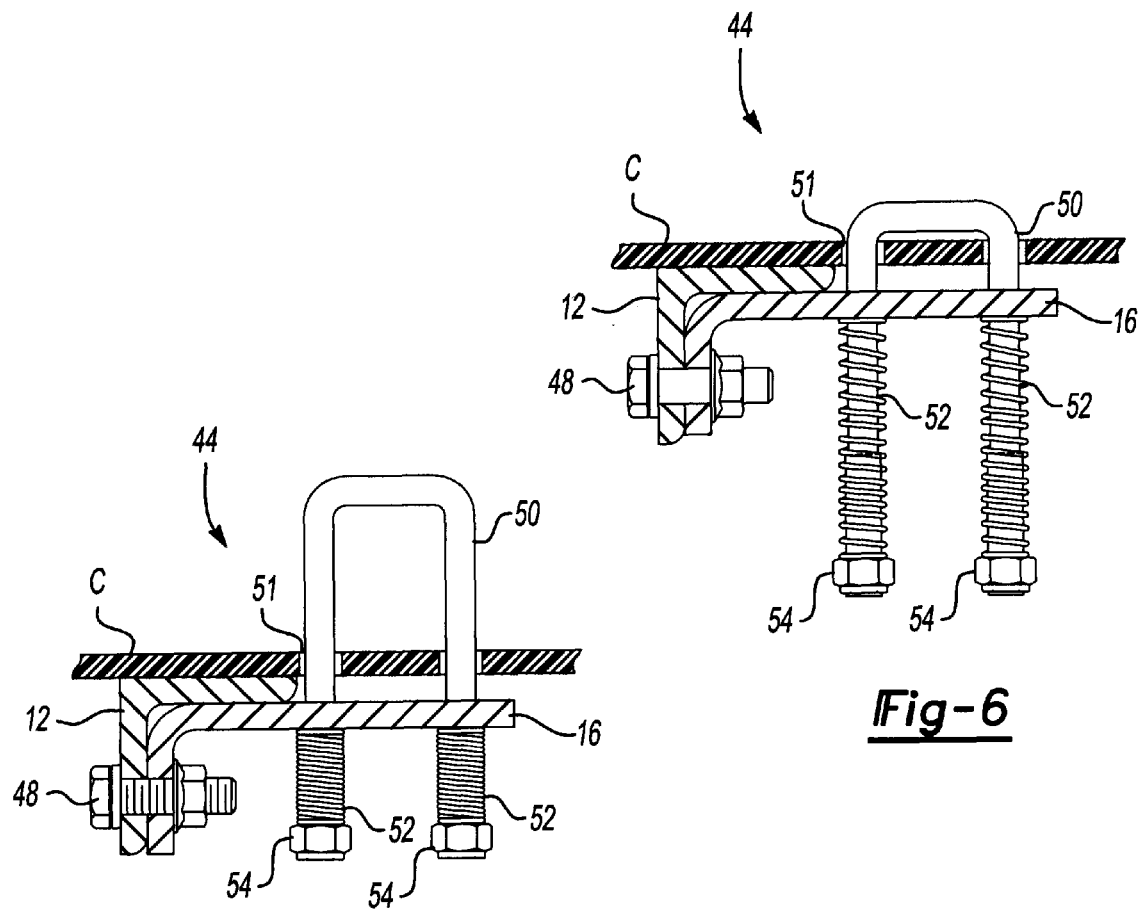
FIG. 5 is a cross-sectional view of the safety chain tie down assembly of the invention taken along line 5—5 of FIG. 4 when in an extended position.
FIG. 6 is a cross-sectional view of the safety chain tie down assembly of the invention taken along line 5—5 of FIG. 4 when in a retracted position.

Referring now to FIGS. 5 and 6, the underbed gooseneck hitch assembly 10 of the invention includes a safety chain tie down assembly, shown generally at 44. The safety chain tie down assembly 44 includes the pair of support brackets 16 secured to one of the angle brackets 12 by fasteners 18, such as bolts and nuts, and the like. A generally U-shaped member 50, such as a U-shaped bolt having threaded ends is inserted through apertures 51 in the cargo bed C and apertures 53 in support brackets 16. A biasing means 52, such as a compression spring, is provided around each threaded end of the bolt 50. The springs 52 are held in place by a fastener 54, such as a nut threaded onto the threaded end of the bolts 50. The spring 52 provides a biasing force to urge the bolt 50 in a downward direction to position the safety chain tie down assembly 44 in a retracted position, as shown in FIG. 6. The user can pull upward an the bolts 50 with a force greater than the biasing force of the springs 52 to place the safety chain tie down 44 in an extended position, as shown in FIG. 5. While in the extended position, the user can thread a safety chain (not shown) between the ball plate 15 and the bolts 50 of the safety chain tie down 44. Once the safety chain is properly fed through the bolts 50, then the user can then simply release the bolts 50 and the biasing force of the springs 52 will cause the bolts 50 to move downward to securely hold the safety chain in place.

It will be appreciated that the invention is not limited by the specific shape of the U-shaped member 50, and that the invention can be practiced with any desired shape for threading the safety chain through an opening formed by the member 50 and cargo bed C. For example, the member 50 can be a threaded bolt with an eyelet at one end and a threaded end at the other end. The safety chain can be threaded through the eyelet while the fastener 54 is threaded on the other end of the member 50 to hold the spring 50 in place. Obviously, many other variations of the member 50 are possible and are within the scope of this invention.

Figure 4:
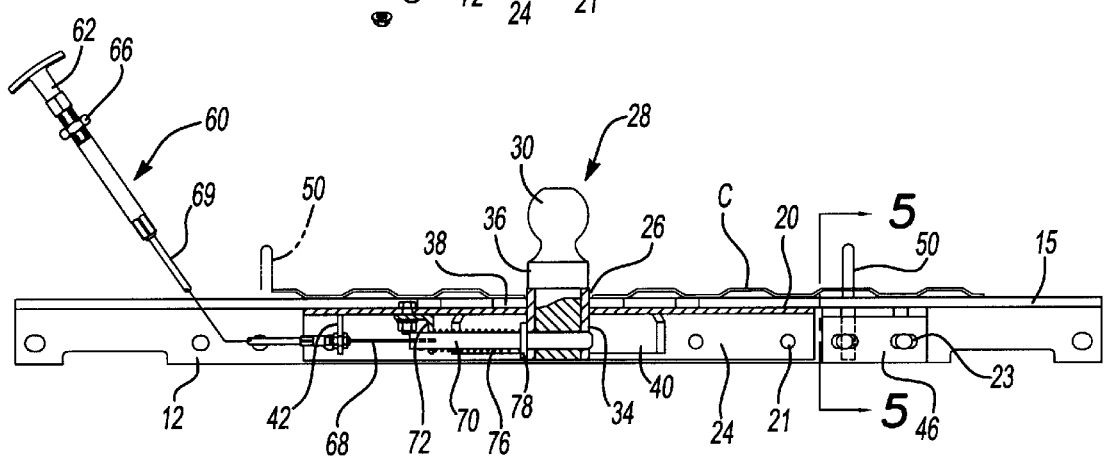
FIG. 4 is a cross-sectional view of the ball, ball socket, retaining pin and pull cable handle assembly of the invention taken along line 4—4 of FIG. 2.

Referring now to FIGS. 2 and 4, the underbed gooseneck hitch assembly 10 of the invention also includes a pull cable handle assembly, shown generally at 60. The pull cable handle assembly 60 includes a release handle assembly 62 mounted to a desired location in the cargo bed C of the vehicle V, such as in front of or behind a wheel well W, as best shown in FIG. 1. To mount the release handle assembly 62, one end of the release handle assembly 62 may be attached to the cable brace 42 using a threaded fastener 64, such as a washer, nut, and the like. The other end of the release handle assembly 62 may be mounted to the wheel well W using a similar threaded fastener 66. A pull cable 68 is positioned within a protective housing 69 of the release handle assembly 62 and extends outwardly from one end of the release handle assembly 62 in the direction of the ball socket 26. The pull cable 68 and housing 69 should be positioned away from moving drive line parts and the exhaust system of the vehicle V.

As best seen in FIGS. 2 and 4, a retaining pin 70 is connected to one end of the pull cable 68. A pin guide 72 for supporting and guiding one end of the retaining pin 70 into the hole 34 of the ball hitch 28 is mounted to the underside of the channel housing 20 using threaded fasteners 74, such as bolts and nuts, and the like. A biasing means 76, such as a compression spring, for urging the retaining pin 70 toward the ball socket 26 is positioned between the pin guide 72 and a positioning washer 78 secured to the retaining pin 70. The washer 78 is positioned on the retaining pin 70 so as to allow the spring 76 to urge one end of the retaining pin 70 through the hole 34 of the ball hitch 28 to securely hold the ball hitch 28 within the ball socket 26.

To install the ball hitch 28, the user unlocks the handle 62 by turning the handle 62. Then, the user pulls the handle 62 outwardly to fully retract the retaining pin 70 from the ball socket 26 and compresses the spring 76. Then, the user can turn the handle 62 in the opposite direction to lock the handle 62 in place. At this point, the retaining pin 70 should not be visible within the ball socket 26.

Next, the user inserts the shank portion 32 of the ball hitch 28 into the ball socket 26. The user may need to rotate the ball hitch 28 while inserting the shank portion 32 into the ball socket 26 in order to align the arrow 33 on the central portion 36 of the ball hitch 28 with the notch 27 on the ball socket 26. Once the arrow 33 and the notch 27 are aligned, the hole 34 in the ball hitch 28 is horizontally aligned with the retaining pin 70. The shank portion 32 of the ball hitch 28 is inserted into the ball socket 26 until the central portion 36 of the ball hitch 28 engages the ball socket 26. Once the central portion 36 engages the ball socket 26, the hole 34 in the ball hitch 28 is vertically aligned with the retaining pin 70. At this point, the hole 34 in the ball hitch 28 is horizontally and vertically aligned with the retaining pin 70 so that the retaining pin 70 can easily be inserted through the hole 34.

Next, the user unlocks the handle 62 by turning the handle 62. Then, the user releases the handle 62. The biasing force of the spring 76 causes the retaining pin 70 to be inserted within the hole 34 of the ball hitch 28, thereby positively securing the ball hitch 28 within the ball socket 26. Then, the user turns the handle 62 in the opposite direction to lock the handle 62. At this point, the user can pull upward on the ball hitch 28 to verify that the retaining pin 70 is positively securing the ball hitch 28 in place.

The underbed gooseneck hitch assembly 10 of the invention has several distinct advantages over conventional ball hitch assemblies. One advantage is that the ball hitch 28 of the invention is prevented from axial or radial movement because the retaining pin 70 is inserted into the holes 25, 34 that extend through both walls of the ball socket 26 and the ball hitch 28, respectively. As a result, the ball hitch 28 is more positively secured in place than conventional hitch assemblies.

Another advantage of the invention is that the retaining pin 70 is attached to the handle 62 that can be mounted in a variety of locations within the cargo bed C or wheel well W. For example, the handle 62 can be mounted to enable the operator to insert or retract the retaining pin 70 while inserting or retracting the ball hitch 28. In addition, the pull cable assembly 60 provides a means to easily retract and insert the retaining pin 70 through the holes 25, 34 of the ball socket 26 and ball hitch 28, respectively.

Yet another advantage is the rigid construction of the underbed gooseneck hitch 10 of the invention. Specifically, the support brackets 16 are secured directly to the angle brackets 12, as compared to conventional hitch assemblies in which the attachment brackets may be clamped to the top surface of the channel housing. Further, the ball hitch 28 is inserted directly into the ball socket 26 that is part of the channel housing 20, as compared to conventional hitch assembly in which the ball hitch may be attached to a sleeve with a fastener and the sleeve is then inserted into another sleeve at which point the entire ball hitch sleeve assembly is pinned in place.

While the invention has been specifically described in connection with certain specific embodiments thereof, it is to be understood that this is by way of illustration and not of limitation, and the scope of the appended claims should be construed as broadly as the prior art will permit.

What is claimed is:

1. An underbed gooseneck hitch assembly securable to a vehicle having a pair of spaced apart frame members and a cargo bed, said hitch comprising:
   a housing attached to the frame members of the vehicle, the housing including an opening;
   a ball socket having outer walls, at least one of the outer walls including a socket hole, the ball socket being alignable with the opening in the housing;
   a ball hitch including a hitch hole alignable with the socket hole in the ball socket; and
   a pull cable assembly including a retaining pin capable of being inserted into the socket hole and the hitch hole, wherein the retaining pin of the pull cable assembly positively secures the ball hitch in the ball socket when a portion of the retaining pin is inserted through the aligned socket hole and hitch hole.

2. The hitch according to claim 1, further including a safety chain tie down assembly.

3. The hitch according to claim 2, wherein the safety chain tie down assembly comprises one or more spring-biased members.

4. The hitch according to claim 1, wherein the ball socket and the ball hitch both include indicia for aligning the hole in the ball hitch with the retaining pin of the pull cable assembly.

5. The hitch according to claim 4, wherein the indicia on the ball socket comprises a notch, and wherein the indicia on the ball hitch comprises an arrow or similar indicia.

6. The hitch according to claim 1, wherein the ball hitch further includes a central portion having an outer diameter larger than an inside diameter of the ball socket for aligning the hole in the ball socket with the hole in the ball hitch.

7. The hitch according to claim 1, wherein the housing is attached to a pair of angle brackets.

8. The hitch according to claim 7, wherein the pair of angle brackets is attached to a pair of frame mounting brackets.

9. The hitch according to claim 1, wherein the pull cable assembly further includes a pull cable handle operatively coupled to the retaining pin, wherein insertion of the ball hitch is accomplished by turning the pull cable handle to an unlocked position, rotating the pull cable handle to a locked position, and inserting the ball hitch into the ball socket.

10. The hitch according to claim 9, wherein removal of the ball hitch is accomplished by turning the pull cable handle to the unlocked position, pulling the pull cable handle outwardly until the retaining pin is no longer received in the ball hitch, rotating the pull cable handle to a locked position, and removing the ball hitch from the ball socket.

11. An underbed gooseneck hitch assembly securable to a vehicle having a pair of parallel spaced frame rails, said hitch assembly comprising:
   a housing including an opening;
   a ball socket having outer walls, at least one of the outer walls including a socket hole, the ball socket being alignable with the opening in the housing;
   a retaining pin;
   a ball hitch including a neck portion, a central portion and a shank portion including a hitch hole alignable with the socket hole in the ball socket,
   wherein the ball socket and the ball hitch both include indicia for aligning the socket hole and hitch hole, and wherein the retaining pin positively secures the ball hitch in the ball socket when a portion of the retaining pin is inserted through the aligned socket hole and hitch hole.

12. The hitch according to claim 8, wherein the central portion of the ball hitch has an outer diameter slightly larger than an inner diameter of the ball socket to engage the ball socket and align the hitch hole in the shank portion of the ball hitch with the socket hole in the ball socket.

13. The hitch according to claim 11, further including a safety chain tie down assembly.

14. The hitch according to claim 13, wherein the safety chain tie down assembly comprises one or more spring-biased members.

15. The hitch according to claim 11, wherein the housing is attached to a pair of angle brackets.

16. The hitch according to claim 15, wherein the pair of angle brackets is attached to a pair of frame mounting brackets.

17. The hitch according to claim 11, further including a pull cable handle operatively coupled to the retaining pin, wherein insertion of the ball hitch is accomplished by turning the pull cable handle to an unlocked position, rotating the pull cable handle to a locked position, and inserting the ball hitch into the ball socket.

18. The hitch according to claim 17, wherein removal of the ball hitch is accomplished by turning the pull cable handle to the unlocked position, pulling the pull cable handle outwardly until the retaining pin is no longer received in the ball hitch, rotating the pull cable handle to a locked position, and removing the ball hitch from the ball socket.

19. The hitch according to claim 11, wherein the indicia on the ball socket comprises a notch, and wherein the indicia on the ball hitch comprises an arrow or similar indicia.

20. An underbed gooseneck hitch assembly, comprising:
a housing including an opening;
a ball socket having outer walls, at least one of the outer walls including a socket hole alignable with the opening in the housing;
a ball hitch including a hitch hole alignable with the socket hole in the ball socket;
a safety chain tie down assembly including at least one support bracket secured to at least one angle bracket, the at least one support bracket including an aperture for receiving a spring-biased member;
a pull cable assembly including a retaining pin capable of being inserted into the socket hole and the hitch hole, and
wherein the retaining pin of the pull cable assembly positively secures the ball hitch in the ball socket when a portion of the retaining pin is inserted through the aligned socket hole and hitch hole.

21. The hitch according to claim 20, wherein the pull cable assembly further includes a pull cable handle operatively coupled to the retaining pin, wherein insertion of the ball hitch is accomplished by turning the pull cable handle to an unlocked position, rotating the pull cable handle to a locked position, and inserting the ball hitch into the ball socket.

22. The hitch according to claim 21, wherein removal of the ball hitch is accomplished by turning the pull cable handle to the unlocked position, pulling the pull cable handle outwardly until the retaining pin is no longer received in the ball hitch, rotating the pull cable handle to a locked position, and removing the ball hitch from the ball socket.

23. An underbed gooseneck hitch assembly, comprising:
a housing including an opening;
a ball socket having outer walls, at least one of the outer walls including a socket hole alignable with the opening in the housing;
a ball hitch including a hitch hole alignable with the socket hole in the ball socket;
a safety chain tie down assembly including at least one support bracket secured to at least one angle bracket, the at least one support bracket including an aperture for receiving a spring-biased member;
wherein the ball socket and the ball hitch both include indicia for aligning the hole in the ball hitch with the retaining pin of the pull cable assembly.

24. An underbed gooseneck hitch assembly, comprising:
a housing including an opening;
a ball socket having outer walls, at least one of the outer walls including a socket hole alignable with the opening in the housing;
a ball hitch including a hitch hole alignable with the socket hole in the ball socket;
a safety chain tie down assembly including at least one support bracket secured to at least one angle bracket, the at least one support bracket including an aperture for receiving a spring-biased member;
wherein the ball hitch further includes a central portion having an outer diameter larger than an inside diameter of the ball socket for aligning the hole in the ball socket with the hole in the ball hitch.

\* \* \* \* \*